United States Patent
Vallejos Campos et al.

(10) Patent No.: US 11,750,955 B2
(45) Date of Patent: Sep. 5, 2023

(54) ROUTING METHOD FOR DYNAMIC WDM OPTICAL NETWORKS WITH WAVELENGTH CONTINUITY CONSTRAINTS

(71) Applicant: UNIVERSIDAD TÉCNICA FEDERICO SANTA MARIA, Valparaíso (CL)

(72) Inventors: Reinaldo Antonio Vallejos Campos, Valparaíso (CL); Nicolás Jara Carvallo, Valparaíso (CL)

(73) Assignee: UNIVERSIDAD TÉCNICA FEDERICO SANTA MARIA, Valparaiso (CL)

(*) Notice: Subject to any disclaimer, the term of this patent is extended or adjusted under 35 U.S.C. 154(b) by 0 days.

(21) Appl. No.: 18/091,947

(22) Filed: Dec. 30, 2022

(65) Prior Publication Data

US 2023/0156381 A1    May 18, 2023

Related U.S. Application Data

(63) Continuation of application No. 17/419,202, filed as application No. PCT/CL2019/050120 on Nov. 26, 2019.

(30) Foreign Application Priority Data

Dec. 28, 2018   (CL) ................................. 3851-2018

(51) Int. Cl.
*H04J 14/02*        (2006.01)
*H04Q 11/00*        (2006.01)

(52) U.S. Cl.
CPC ...... *H04Q 11/0062* (2013.01); *H04J 14/0227* (2013.01); *H04Q 11/0003* (2013.01)

(58) Field of Classification Search
CPC .................................................. H04J 14/0227
See application file for complete search history.

(56) References Cited

U.S. PATENT DOCUMENTS

| 8,369,707 B2 | 2/2013 | D'Alessandro et al. |
| 8,693,871 B2 | 4/2014 | de Carvalho Resende et al. |

(Continued)

FOREIGN PATENT DOCUMENTS

| CN | 100592702 C | 2/2010 |
| CN | 1989718 B | 7/2012 |

(Continued)

OTHER PUBLICATIONS

Zhang et al., "Dynamic Traffic Grooming in Elastic Optical Networks", IEEE Journal on Selected Areas in Communications, vol. 31, No. 1, Jan. 2013 (Year: 2013).*

(Continued)

*Primary Examiner* — Shi K Li
(74) *Attorney, Agent, or Firm* — Procopio, Cory, Hargreaves & Savitch LLP (57) ABSTRACT

The present invention provides a novel computer-implemented routing method for a dynamic wavelength-division multiplexing (WDM) optical network having wavelength continuity constraints. The method is more efficient than the existing methods, in terms of number of wavelengths, and due to the fixed routing strategy used, its implementation is simple, and its online operation is very fast.

8 Claims, 5 Drawing Sheets

(56) References Cited

U.S. PATENT DOCUMENTS

| | | |
|---|---|---|
| 9,060,215 B2 | 6/2015 | Miedema |
| 2008/0037982 A1* | 2/2008 | Niven-Jenkins ........ H04L 45/62 398/25 |
| 2009/0296719 A1* | 12/2009 | Maier ................... H04L 45/123 370/400 |
| 2014/0086576 A1 | 3/2014 | Campbell et al. |

FOREIGN PATENT DOCUMENTS

| | | |
|---|---|---|
| EP | 2084493 B1 | 9/2013 |
| EP | 1943784 B1 | 2/2017 |

OTHER PUBLICATIONS

Dijkstra, E. W. A Note on Two Problems in Connexion with Graphs. Numerische Mathematik 1, 269-271 (1959). English Language. 3 pages.

Tang, Hui et al. A Review of Routing and Wavelength Assignment Approaches for Wavelength-Routed Optical WDM Networks. Department of Computer Science, University of California, Davis, CA 95616. Department of Computer Science, The University of Texas at Dallas, Richardson, TX 75083. Correspondence Author: Hui Zang, Telephone: (530) 752-5129, Fax (530) 752-4767; email: zang@cs.ucdavis.edu. Aug. 13, 1999. English Language. 25 pages.

Astorga Cornejo, Joaquin Custodio. Resolucion de Notificacion del Informe Pericial (ley nueva) for related CL Application No. 2018-003851 dated Jun. 9, 2021. Name of Applicant: Universidad Tecnica Federico Santa Maria. English Language. 8 pages.

International Search Report and Written Opinion for related PCT Application No. PCT/CL2019/050120 dated Mar. 20, 2020. Spanish Language. 13 pages.

* cited by examiner

NON-ASSIGNED USERS TABLE 610

| Source Node | Destination Node | Rho | Node 0 | Node 1 | Node 2 | Node 3 | Node 4 | Node 5 | ... | Node N |
|---|---|---|---|---|---|---|---|---|---|---|
| Node A | Node E | Rho A,E | Node A | Node C | Node E | | | | ... | |
| ... | ... | ... | ... | ... | ... | ... | | | ... | |
| Node B | Node J | Rho B,J | Node B | Node D | Node H | Node J | | | ... | |
| ... | ... | ... | ... | ... | ... | ... | | | ... | |

FIG. 5B

DEFINITIVE ROUTES USERS TABLE 620

| Source Node | Destination Node | Rho | Node 0 | Node 1 | Node 2 | Node 3 | Node 4 | Node 5 | ... | Node N |
|---|---|---|---|---|---|---|---|---|---|---|
| Node I | Node J | Rho I,J | Node I | Node J | | | | | ... | |
| ... | ... | ... | ... | ... | ... | | | | ... | |
| Node A | Node F | Rho A,F | Node A | Node B | Node F | | | | ... | |
| ... | ... | ... | ... | ... | ... | | | | ... | |

FIG. 5C

DEFINITIVE ROUTES TABLE 630

| Source Node | Destination Node | Node 0 | Node 1 | Node 2 | Node 3 | Node 4 | Node 5 | ... | Node N |
|---|---|---|---|---|---|---|---|---|---|
| Node I | Node J | Node I | Node J | | | | | ... | |
| ... | ... | ... | ... | ... | | | | ... | |
| Node A | Node F | Node A | Node B | Node F | | | | ... | |
| ... | ... | ... | ... | ... | | | | ... | |

FIG. 5D

ROUTING METHOD FOR DYNAMIC WDM OPTICAL NETWORKS WITH WAVELENGTH CONTINUITY CONSTRAINTS

CROSS-REFERENCE TO RELATED APPLICATIONS

The present application is a Continuation-In-Part of U.S. patent application Ser. No. 17/419,202, filed on Jun. 28, 2021, which is a National Phase Entry of International Patent Application No. PCT/CL2019/050120 filed on Nov. 26, 2019, which claims the benefit of Chilean Patent Application No. 3851-2018 filed on Dec. 28, 2018, the disclosure of which are expressly incorporated herein by reference.

FIELD OF APPLICATION

The present invention focuses on the field of optical networks, specifically on the field of dynamic optical networks with wavelength continuity constraints and its objective is to provide a routing method for dynamic optical networks with wavelength continuity constraints.

BACKGROUND OF THE INVENTION

Routing is a basic component of network operation: each user connection is defined by a pair of nodes in the network: the source node (the one that transmits the information) and the destination node (the one that receives the information). For said pair of nodes to communicate, the designer must assign a route to be followed by the data to be transmitted (which is known as the routing problem). Then, the routing problem is to assign each connection to a specific route. This problem can be solved for two different forms of network operation. These forms are static network operation and dynamic network operation. Currently, optical networks are inefficient, since they work statically; that is, resources are permanently assigned to each user from source to destination, regardless of the percentage of time being used. This operation is clearly suboptimal; therefore, a possible improvement is to migrate into a dynamic operation. A dynamic operation means assigning resources to each user only when communication is requested. Accordingly, the objective of this invention is to solve the problem of routing in dynamic optical networks.

The routing problem for dynamic optical networks has been widely studied in the literature, due to its large impact on the cost of the network (CapEx) and in the performance of the network. This task is generally solved in order to simultaneously minimize the cost of the network while guaranteeing that the performance of the network meets the level established in the service-level agreement (SLA). To solve the routing problem, several approaches have been proposed, such as: fixed routing, fixed alternate routing, and adaptive routing. In "*A review of routing and wavelength assignment approaches for wavelength-routed optical WDM networks*" by Zang et al. published in Optical Networks Magazine, 1 (1): 47-60, 2000, there is an exhaustive revision on these routing strategies.

The routing problem is largely affected by whether there is a wavelength conversion capability at the optical nodes or not. The wavelength conversion capability means that, if a node receives an incoming signal at a particular wavelength, then the node may transmit the signal on any output channel but using a different wavelength. The wavelength conversion technology is not fully available, therefore current optical networks must comply with the wavelength continuity constraint, that is, when an end-to-end communication between any pair of nodes is performed, the route connecting them must use the same wavelength on each link of the route. However, in the context of dynamic optical networks, different transmissions from the same user may be transmitted at different wavelengths, but in a given transmission the wavelength constraint must be satisfied.

The main patents relating to the routing problem in dynamic WDM optical networks with wavelength continuity constraints are described below.

U.S. Pat. No. 9,060,215 B2, dated Jun. 16, 2015, entitled "Network specific routing and wavelength assignment for optical communications networks"; by Miedema et. al., belonging to Ciena Corporation, discloses a genetic algorithm for solving routing and wavelength assignment in optical networks having dynamic wavelength routing. The method proposes an iterative method, based on genetic algorithms. The network operator can choose the adaptation function to find a good solution based on any criteria defined by the network operator.

U.S. Pat. No. 8,693,871 B2, dated Apr. 8, 2014, entitled "System for routing and wavelength assignment in wavelength division multiplexing optical networks"; by Resende et. al., belonging to AT&T Intellectual Property I LP, describes a method for solving routing and wavelength assignment. This method seeks to minimize the number of wavelengths used, using a bin-packing problem solution, seeking to solve the minimum number of bins, wherein the wavelengths are bins. This method assigns the wavelengths with the new versions of the First-Fit, Best-Fit, First-Fit-Decreasing, and Best-Fit Decreasing methods, using bins.

U.S. Pat. No. 2014/086576 A1, dated Mar. 27, 2014, entitled "Determining least-latency paths across a provider network utilizing available capacity" by Campbell et al., belonging to Verizon Patent and Licensing, Inc., discloses a system for calculating one or more alternate paths for each user of the network. The aims of this method are to minimize the latency of each user and decrease the number of necessary wavelength conversion processes. However, this technique solves this problem in a static network operation; this means that the resources are assigned to each user permanently. In contrast, our invention solves the routing problem in a dynamic network operation, whereby the resources are assigned to each user on demand, only when the source node wishes to transmit to the destination.

SUMMARY OF THE INVENTION

The present invention provides a computer-implemented routing method for a dynamic wavelength-division multiplexing (WDM) optical network having wavelength continuity constraints, characterized in that it comprises the steps of:
a) obtaining, by means of a computational device, a topology of the dynamic WDM optical network having wavelength continuity constraints, wherein the dynamic WDM optical network is represented by a graph $\mathcal{G}=(\mathcal{N}, \mathcal{L})$ comprised of a plurality $\mathcal{N}$, of nodes interconnected by a plurality $\mathcal{L}$, of links;
b) obtaining, by means of said computational device, a plurality of users of the network and a traffic load associated with each user of the plurality of users, wherein each user is defined as a source node and a destination node;

c) obtaining, by means of said computational device, a plurality of non-assigned users from the plurality of users, and storing said plurality of non-assigned users in a non-assigned users database, wherein each non-assigned user is defined as a user without a definitive route;

d) obtaining, by means of said computational device, a plurality of preliminary routes for the plurality of non-assigned users, wherein each non-assigned user has a preliminary route that uses the minimum number of links interconnecting the source node and the destination node of said non-assigned user;

e) sorting, by means of said computational device, the plurality of non-assigned users stored on the non-assigned users database according to the number of links used by the preliminary route of each non-assigned user, and sorting the non-assigned users having preliminary routes using equal number of links according to the traffic load, wherein the non-assigned users having preliminary routes using equal number of links and having equal traffic load are sorted randomly, for obtaining a list of the plurality of non-assigned users sorted;

f) storing, by means of said computational device, the non-assigned users having preliminary routes that use a number of links equal to 1 link in a definitive routes users database, and removing said non-assigned users having said preliminary routes that use the number of links equal to 1 link from the non-assigned users database, wherein each non-assigned user stored in the definitive routes users database is defined as a user with a definitive route;

g) selecting, by means of said computational device, the first non-assigned user from the list of the plurality of non-assigned users sorted and stored on the non-assigned users database;

h) calculating, by means of said computational device, a cost for each link of the network using the traffic load of each link used by the definitive route of each user stored in the definitive routes users database, wherein the links not used by any definitive route are assigned traffic load equal to 0, and an average traffic load of each link of the network, wherein the cost of each link $C_\ell$ of the network is calculated by the formula:

$$C_\ell = e^\rho \ell^{-\bar{\rho}}$$

wherein $\rho_\ell$ is the traffic load of the link $\ell$ and $\bar{\rho}$ is the average traffic load of the network, and links that are not used by any definitive route are assigned traffic load equal to 0;

i) obtaining, by means of said computational device, a definitive route for said selected non-assigned user, wherein the definitive route is defined as the cheapest route, where the cost of a route is equal to the sum of the cost of each of its links;

j) storing, by means of said computational device, the selected non-assigned user with the definitive route in the definitive route users database and removing said user from the non-assigned users database;

k) repeating, by means of said computational device, the steps g), h), i) and j) until no users remain in said non-assigned users database; and l) storing, by means of said computational device, the definitive routes of each user in a definitive route database.

In a preferred embodiment, in step e), the plurality of non-assigned users stored on the non-assigned users database are sorted according to the number of links used by the preliminary route of each non-assigned user, from the non-assigned user having the preliminary route that uses less links to the non-assigned user having the preliminary route that uses more links, and wherein the non-assigned users having preliminary routes using equal number of links are sorted according to the traffic load, from the lowest to highest traffic load.

In another preferred embodiment, in step e), the plurality of non-assigned users stored on the non-assigned users database are sorted according to the number of links used by the preliminary route of each non-assigned user, from the non-assigned user having the preliminary route that uses less links to the non-assigned user having the preliminary route that uses more links, and wherein the non-assigned users having preliminary routes using equal number of links are sorted according to the traffic load, from the highest to lowest traffic load.

In another preferred embodiment, in step e), the plurality of non-assigned users stored on the non-assigned users database are sorted according to the number of links used by the preliminary route of each non-assigned user, from the non-assigned user having the preliminary route that uses more links to the non-assigned user having the preliminary route that uses less links, and wherein the non-assigned users having preliminary routes using equal number of links are sorted according to the traffic load, from the highest to lowest traffic load.

In another preferred embodiment, in step e), the plurality of non-assigned users stored on the non-assigned users database are sorted according to the number of links used by the preliminary route of each non-assigned user, from the non-assigned user having the preliminary route that uses more links to the non-assigned user having the preliminary route that uses less links, and wherein the non-assigned users having preliminary routes using equal number of links are sorted according to the traffic load, from the lowest to highest traffic load.

In a preferred embodiment, the traffic load of each link $\ell$, $\rho_\ell$, is calculated by the formula:

$$\rho_\ell = \sum_{u_\ell} \rho_u$$

wherein $u_\ell$ is the plurality of users whose definitive routes uses the link $\ell$ and $\rho_u$ is the traffic load of the selected non-assigned user u, and links that are not used by any definitive route are assigned traffic load equal to 0. In a preferred embodiment, the average traffic load, $\bar{\rho}$, is obtained by the formula $$\bar{\rho} = \frac{\sum_\ell \rho_\ell}{L}.$$

In a preferred embodiment, the non-operational routes are obtained by means of the Dijkstra algorithm.

DETAILED DESCRIPTION OF THE INVENTION

The diagrams presented in the attached figures describe the environment of the invention.

Figure 2:
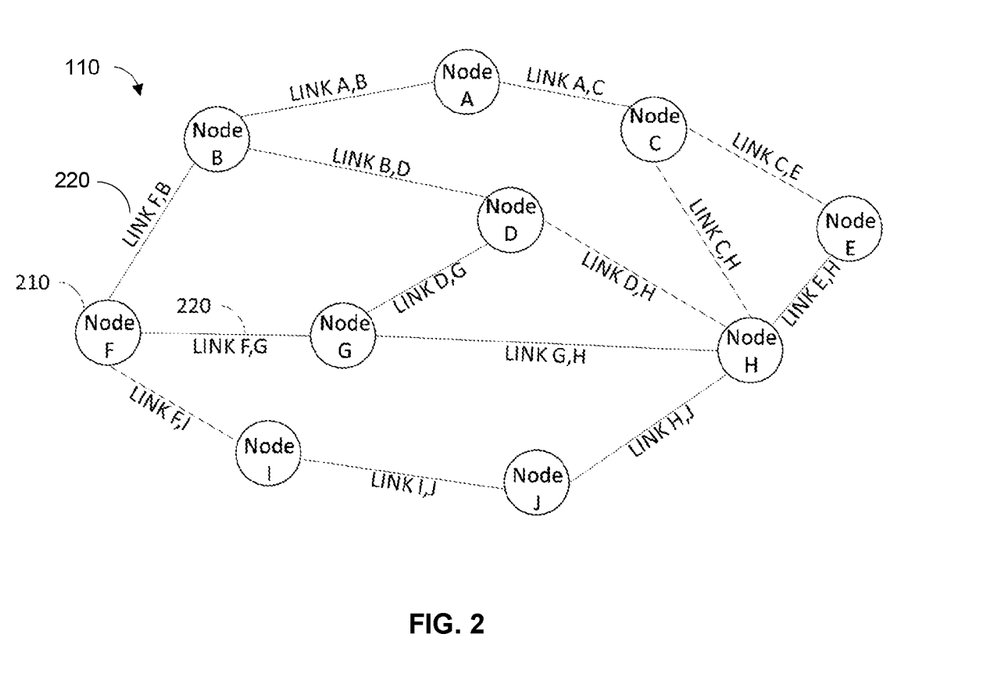
FIG. 2 is a diagram depicting the topology of the provider network 110 of FIG. 1.

The method of the present invention implements a cheapest path by layers algorithm (hereinafter referred to in the text as CPL), which is based on the cheapest route (among all the possible routes) connecting a source node 210 to a destination node 210 in the provider network 110, as seen in FIG. 2, while, simultaneously, the traffic load on the links in the network is as balanced as possible.

Figure 1:
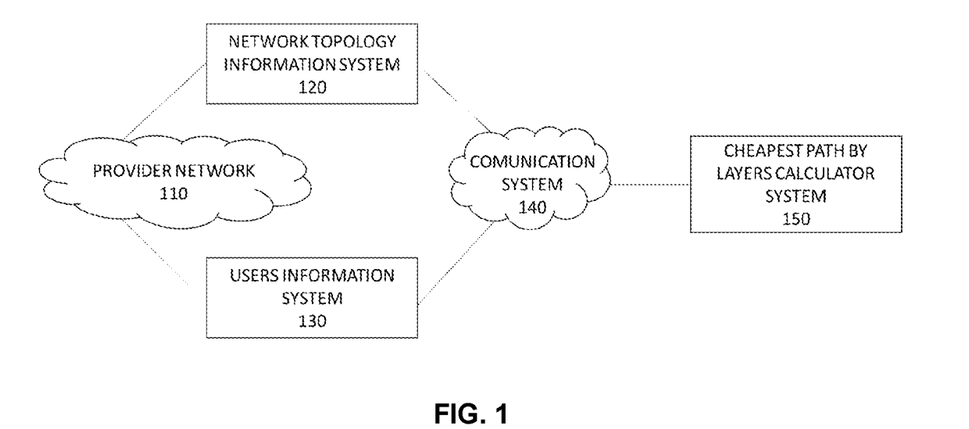
FIG. 1 is a diagram depicting, in a general manner, the type of environment in which the invention is implemented, identifying the main subsystems involved in its operation.

The operation of the CPL method can be performed in environment 100 as shown in FIG. 1. The configuration may be comprised of a provider network 110 and a network topology information system 120, which contains the structure of the network topology of the provider 110. It may also contain a users information system 130, which contains information of a plurality of users and a traffic load associated with each user of said plurality of users using the provider network 110. It should be noted that a user is defined as a source node and a destination node. In addition, the environment 100 has a cheapest path by layers calculator system 150, responsible for calculating the route with the cheapest cost for each user, which is connected to the network topology information system 120 and the users information system 130 through the communication system 140. The route with the cheapest cost should be understood as a definitive route obtained for a given user, whose sum of the cost of its links results in the cheapest route, where the cost of a route is defined as the sum of the traffic loads of all its links.

The provider network 110 is a dynamic wavelength-division multiplexing (WDM) optical network, which can be modeled as a graph $\mathcal{G} = (\mathcal{N}, \mathcal{L})$, comprising a plurality $\mathcal{N}$ of nodes 210 interconnected by a plurality $\mathcal{L}$ of links 220. A network node 210 may be any type of optical network (that is, an optical cross-connect—OXC) without wavelength conversion capabilities.

Figure 3A:
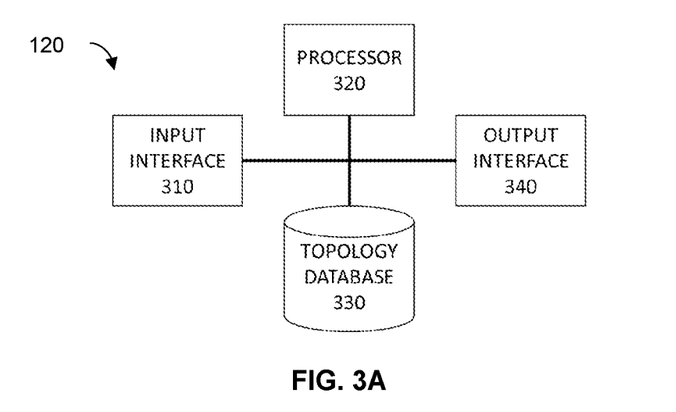
FIG. 3A is a diagram depicting the structure of the network topology information system 120 of FIG. 1.
Figure 3B:
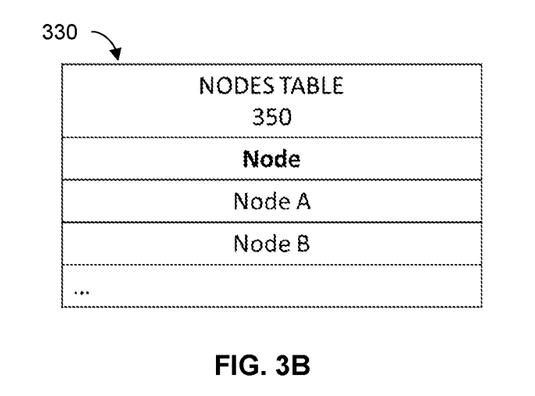
FIG. 3B is a diagram depicting a table for storing the nodes information of FIG. 2.
Figure 3C:
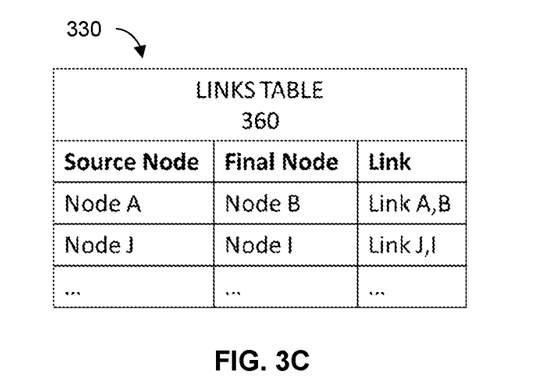
FIG. 3C is a diagram depicting a table for storing the links information of FIG. 2.

The network topology information system 120 may be a server or network device inside or outside the provider network 110. As shown in FIG. 3A, the network topology information system 120 is stored in a topology database 330 and may be comprised of an input interface 310 that receives a request or data from the communication system 140 that are processed by a processor 320. Topology database 330 includes the nodes information 210 and the links information 220 in the provider network 110, using a nodes table 350 to store the nodes 210 and a links table 360 to store the links 220, as described in FIGS. 3B and 3C, respectively. To communicate with other systems or devices, the network topology information system 120 may send messages using the output interface 340.

Figure 4A:
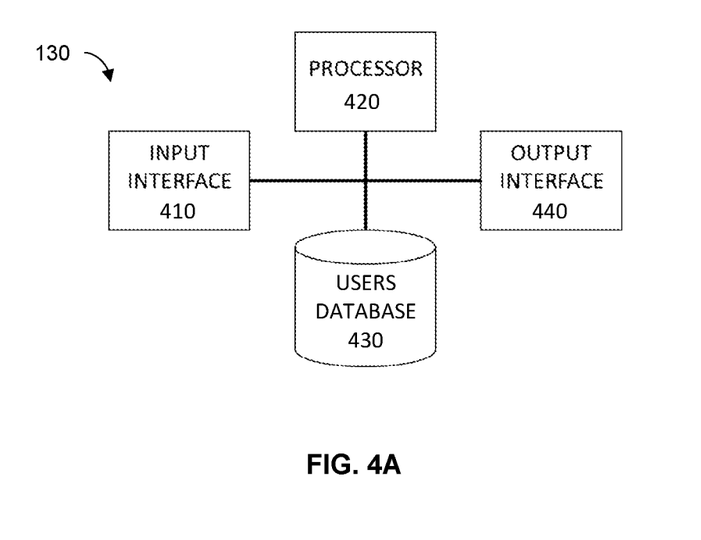
FIG. 4A is a diagram depicting the structure of the users information system 130 of FIG. 1.
Figure 4B:
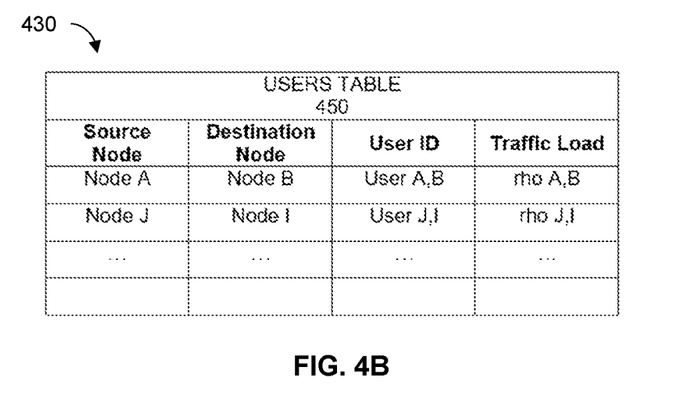
FIG. 4B is a diagram depicting a table for storing network users information pertaining to the users database 430 of FIG. 4A.

As shown in FIG. 4A, the users information system 130 may be a server or network device outside the provider network 110 and may be comprised of an input interface 410 that receives information requests from the communication system 140. This information is processed by the processor 420 and may be stored in the users database 430. The users database 430 contains all users data (pairs of nodes) in the provider network 110, and the traffic load associated with each of them, as presented in the users table 450 shown in FIG. 4B. To interact with other systems and devices, the users information system 130 may send messages using the output interface 440.

Figure 5A:
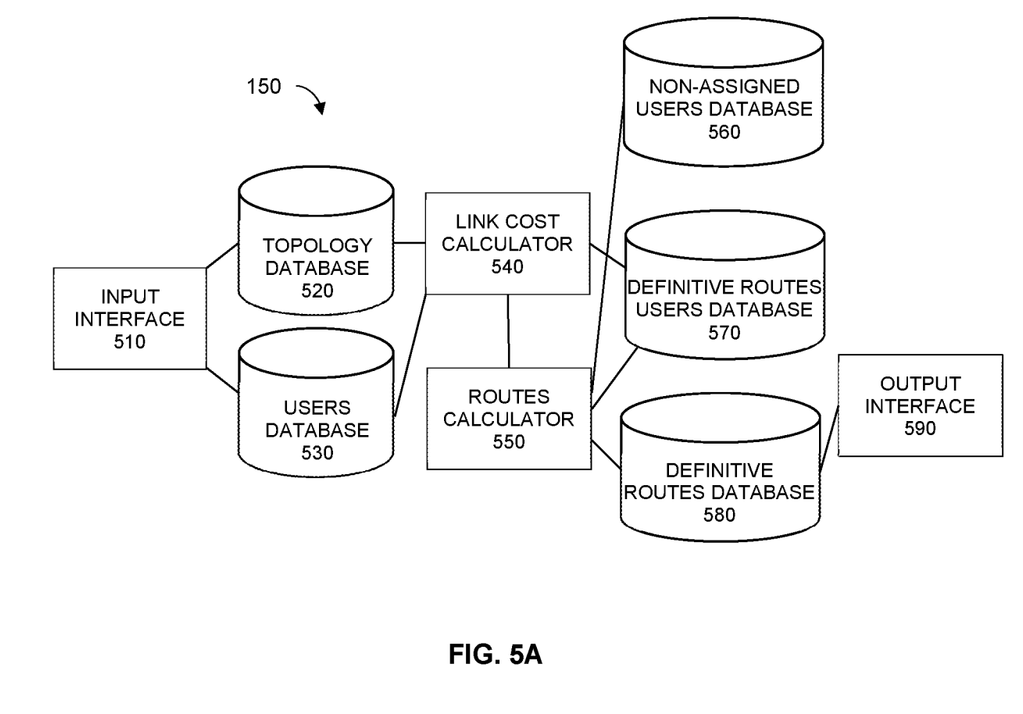
FIG. 5A is a diagram depicting the structure and functional components of the cheapest route by layers calculator system 150 of FIG. 1.

The cheapest path by layers calculator system 150 may be a server or a computer device capable of communicating with other devices, for example, a desktop computer or laptop computer, outside the provider network 110. As shown in FIG. 5A, the cheapest path by layers calculator system 150 may be comprised of an input interface 510, which accepts requests or information from the communication system 140. During execution of the CPL algorithm, the cheapest path by layers calculator system 150 may request data regarding the network topology to the network topology information system 120 and data regarding the users to the users information system 130, respectively. Said information is stored in the device's own databases, either in the topology database 520 with topology data, or in the users database 530 with the users data. A link cost calculator 540 and a route calculator 550 use the information stored in a non-assigned users database 560 and in a definitive routes users database 570 to calculate the costs of each link and each route, respectively. The definitive routes users database 570 contains all those users having their definitive routes calculated during execution of the CPL algorithm, and also contains all those definitive routes. On the other hand, the non-assigned users database 560 contains the plurality of users having preliminary routes and that do not possess a definitive route defined during execution of the CPL algorithm. The link cost calculator 540 uses the topology database 520 information, the users database 530 information, and the definitive routes users database to calculate the cost associated with each link 220. At the same time, the routes calculator 550 is in charge of calculating the route for each user. The results of the CPL algorithm execution may be stored in the definitive routes database 580 or sent to another system or device using the output interface 590, as a definitive routes table 630, as shown in FIG. 5D.

Figure 5B:
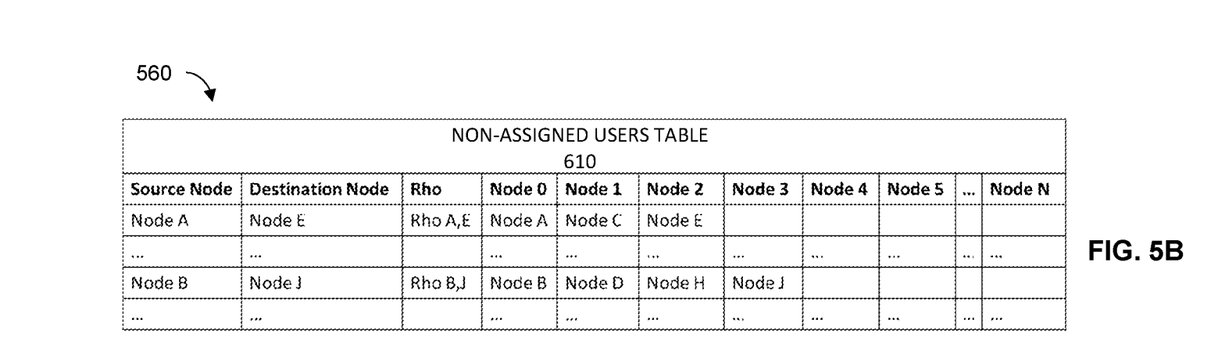
FIG. 5B is a diagram depicting the table of non-assigned users stored in the non-assigned users database 560 of FIG. 5A.
Figure 5C:
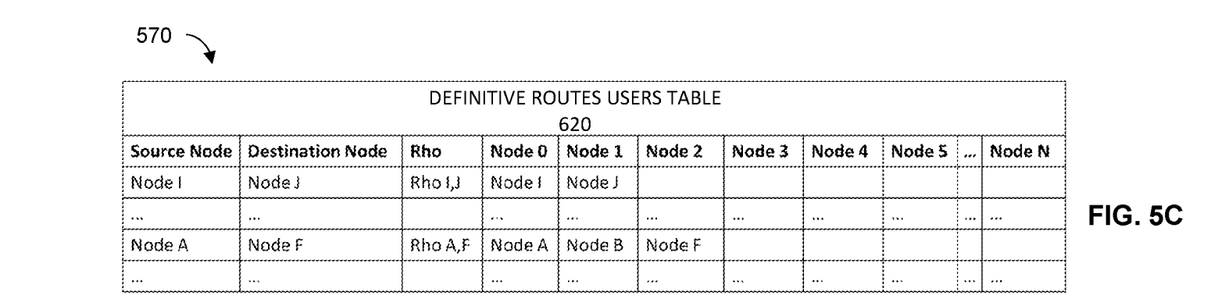
FIG. 5C is a diagram depicting the table of definitive routes calculated and stored in the definitive routes users database 570 of FIG. 5A.
Figure 5D:
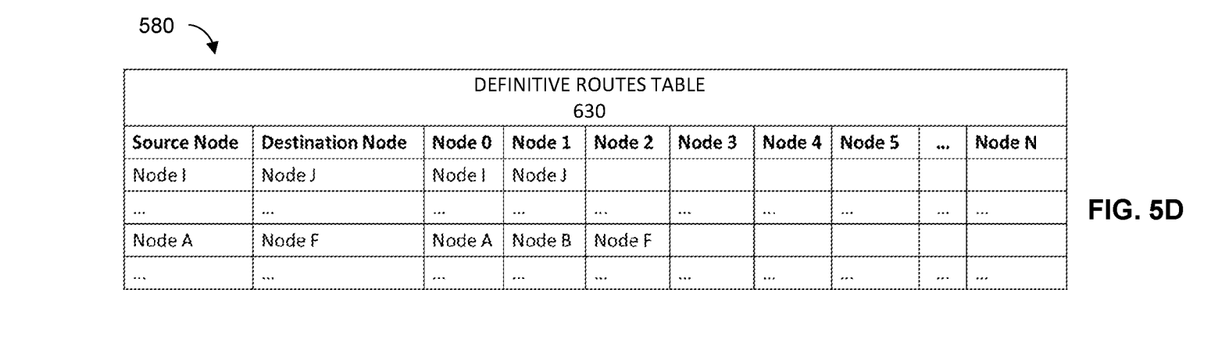
FIG. 5D is a diagram depicting the table of definitive routes stored in the definitive routes database 580 of FIG. 5A.

The structure of the non-assigned users table 610, the definitive routes table 620, and the routes table 630 are shown in FIGS. 5B, 5C and 5D, respectively.

The communication system 140 may be any network system that allows to connect two or more devices, such as the cellular network, the public land mobile network (PLMN), a second generation (2G) network, a third generation (3G) network, a fourth generation (4G), a long-term evolution (LTE) network, a fifth generation (5G), a code division multiple access (CDMA) network, a global system for mobile communications (GSM) network, a general packet radio service (GPRS), a local area network (LAN), a wide area network (WAN), a metropolitan area network (MAN), an ad hoc network, an Intranet, the Internet, a fiber optic based network, a satellite network, television network, or a mixture of one or more of these systems.

Calculation of the Cost of Links and Routes

Each pair of nodes 210 represents a user u, which communicates via a route $r_u$. It is assumed that the cost $C_{r_u}$ of the route $r_u$ is equivalent to the cost of the user u—which is calculated when the definitive route of user u is evaluated—and is given by the sum of the cost of each link, $C_\ell$, assigned to each link $\ell$ belonging to the user's route. Specifically, $C_\ell$ is calculated by the equation (1) and $C_{r_u}$ is calculated by the equation (2).

$$C_\ell = e^{\rho_\ell} \ell^{-\bar{\rho}} \quad (1)$$

$$C_{r_u} = \sum_{\ell \in r_u} C_\ell \quad (2)$$

In equation (1), $\rho_\ell$ is the traffic load of the link $\ell$, which is equal to the sum of the traffic load $\rho_u$ provided by each user u, belonging to the plurality of users $U_\ell$, using the link $\ell$ in their route, as described in equation (3):

$$\rho_\ell = \sum_{u \in U_\ell} \rho_u \quad (3)$$

The method of the present invention uses an iterative procedure to find the route with the cheapest cost for each network user. This iterative procedure calculates the cost of each link on each iterative stage, considering only the users with a definitive route stored in a definitive routes users database. Therefore, the value $\rho_\ell$ sums only the traffic load of the users stored in said definitive routes database.

On the other hand, referring again to equation (1), $\bar{\rho}$ is the average of the traffic load of all links 220 of the provider network 110, as presented in equation (4), wherein $\mathcal{L}$ is the plurality of links 220 in the provider network 110, and L the number of links in $\mathcal{L}$. Again, the users traffic load considered are the ones with a definitive route decided and stored in the definitive routes users database.

$$\bar{\rho} = \frac{\sum_{\ell \in \mathcal{L}} \rho_\ell}{L} \quad (4)$$

EXAMPLE

The CPL algorithm is executed in the cheapest path by layers calculator system 150 and its operation is described below:

1. The cheapest path by layers calculator system 150 requests the network topology information from the network topology information system 120 and stores it in its own topology database 520.
2. The cheapest path by layers calculator system 150 requests the information about the users and their traffic loads from the users information system 130, and stores them in the non-assigned users database 560.
3. The link cost calculator 540 first assigns a traffic load 0 to each link of the topology and calculates the costs of each link using the equation (1). This means that, initially, each link has a cost equal to 1.
4. The route calculator 550 calculates the preliminary routes for each user of the network using any cheapest route algorithm, for example, Dijkstra algorithm (Dijkstra, E. W. A note on two problems in connexion with graphs. *Numer. Math.* 1, 269-271 (1959), the disclosure of which is hereby incorporated by reference in its entirety), based on the network topology and the cost of the links previously defined by the link calculator 540. Initially, since the cost of each link is equal to 1, the preliminary route (or cheapest route) for each user is the one using the minimum number of links interconnecting the source node and the destination node of said user.
5. The route calculator 550 stores the preliminary routes of the non-assigned users in the non-assigned users database 560.
6. The routes calculator 550 sorts the non-assigned users stored in the non-assigned users database 560 according to the number of links used by the preliminary routes of its users, from less number of links to more number of links, or vice versa. The routes with the same number of links are sorted by their traffic load, from lowest to highest traffic load, or vice versa. In the case of tie, i.e., same number of links and same traffic load, the order is arbitrarily chosen. In the present example, the non-assigned users are sorted from less to more number of links, and from lowest to highest traffic load. This step generates a list of the sorted non-assigned users which is stored in the non-assigned users database 560, or in a specific list stored in the route calculator.
7. The routes calculator 550 moves all the non-assigned users with a preliminary route having 1 link, from the non-assigned users database 560 to the definitive routes users database 570, removing them from the non-assigned users database 560. As an example, using the topology shown in FIG. 2, user ID A-B (source node A, destination node B) has a preliminary route using 1 link (link A,B), as well as user ID D-H (source node H, destination node D) has a preliminary route using 1 link (link D,H). Those users are moved to the definitive routes users database 570.
8. The link cost calculator 540 calculates the cost of each link of the network using the cost algorithm described below, considering only the links and traffic load used by the definitive routes of all users stored in the definitive routes users database 570.
9. The routes calculator 550 chooses from the sorted non-assigned users stored in the non-assigned users database 560, the one that it is in the first position of the list generated in the step 6, and calculates the cheapest route using, for example, Dijkstra, considering the cost of the links calculated in step 8. As an example, using the topology of the network in FIG. 2, user ID D-F (source node D, destination node F) has two possible routes among others: a route using link D,G and link G,F, and a route using link B,D and link B,F. Based on the cost of said links, one of those routes is cheaper than the other. Thus, the route calculator 550 assigns the cheapest route to said user ID D-F, among all the possible routes, which will be defined as its definitive route.
10. The routes calculator 550 moves the user with its definitive route calculated in step 9 from the non-assigned users database 560 to the definitive routes users database 570, removing the user from the non-assigned users database 560.
11. Steps 8, 9, and 10 are repeated until no non-assigned user remains stored in the non-assigned users database 560.

12. Finally, when all users are moved to the definitive routes users database 570, this database is sent to the definitive routes database 580.

A network manager may use this routing table (called R) to transfer it and copy it in a centralized or distributed manner to the nodes 210 of the provider network 110.

Cost Algorithm

The link cost calculator 540 performs the following operations for each link stored in topology database 520.

The traffic load $\rho_\ell$ of the link $\ell$ is calculated using equation (3). The plurality of users $U_\ell$ using the link $\ell$ considered in this step correspond to the plurality of users stored in the definitive routes users database 570. The links that are not used by any definitive route are assigned traffic load equal to 0.

The cost $C_\ell$ of link $\ell$ is calculated using equation (1).

The link cost calculator 540 calculates the average traffic load of the links by equation (4).

The cheapest routing method can be used in two different ways:

a) it can be used to generate a route per user, valid for all wavelengths of the network; or b) alternatively, it can be used to generate a route per user, for each different wavelength (or a set of consecutive wavelengths). In this case, the traffic load offered by each user at each wavelength can be evaluated using the method published in "*Blocking Evaluation and Wavelength Dimensioning of Dynamic WDM Networks without Wavelength Conversion*" by Jara et. al. in Journal of Optical Communications and Networking, vol. 9, no. 8, pp. 625-634 (2017), the disclosure of which is hereby incorporated by reference in its entirety, or by any other method available in the literature.

The invention claimed is:

1. A computer-implemented routing method for a dynamic wavelength-division multiplexing (WDM) optical network having wavelength continuity constraints, comprising the steps of:
   a) obtaining, by means of a computational device, a topology of the dynamic WDM optical network having wavelength continuity constraints, wherein the dynamic WDM optical network is represented by a graph $\mathcal{G}=(\mathcal{N}, \mathcal{L})$ comprising a plurality $\mathcal{N}$, of nodes interconnected by a plurality $\mathcal{L}$, of links;
   b) obtaining, by means of said computational device, a plurality of users of the network and a traffic load associated with each user of the plurality of users, wherein each user is defined as a source node and a destination node;
   c) obtaining, by means of said computational device, a plurality of non-assigned users from the plurality of users, and storing said plurality of non-assigned users in a non-assigned users database, wherein each non-assigned user is defined as a user without a definitive route;
   d) obtaining, by means of said computational device, a plurality of preliminary routes for the plurality of non-assigned users, wherein each non-assigned user has a preliminary route that uses the minimum number of links interconnecting the source node and the destination node of said non-assigned user;
   e) sorting, by means of said computational device, the plurality of non-assigned users stored on the non-assigned users database according to the number of links used by the preliminary route of each non-assigned user, and sorting the non-assigned users having preliminary routes using equal number of links according to the traffic load, wherein the non-assigned users having preliminary routes using equal number of links and having equal traffic load are sorted randomly, for obtaining a list of the plurality of non-assigned users sorted;
   f) storing, by means of said computational device, the non-assigned users having preliminary routes that use a number of links equal to 1 link in a definitive routes users database, and removing said non-assigned users having said preliminary routes that use the number of links equal to 1 link from the non-assigned users database, wherein each non-assigned user stored in the definitive routes users database is defined as a user with a definitive route;
   g) selecting, by means of said computational device, the first non-assigned user from the list of the plurality of non-assigned users sorted and stored on the non-assigned users database;
   h) calculating, by means of said computational device, a cost for each link of the network using the traffic load of each link used by the definitive route of each user stored in the definitive routes users database, wherein the links not used by any definitive route are assigned traffic load equal to 0, and an average traffic load of each link of the network, wherein the cost of each link $C_\ell$ of the network is calculated by the formula:

$$C_\ell = e^{\rho_\ell - \bar{\rho}}$$

wherein $\rho_\ell$ is the total traffic load of the link $\ell$ and $\bar{\rho}$ is the average traffic load of the network;
   i) obtaining, by means of said computational device, a definitive route for said selected non-assigned user, wherein the definitive route is defined as the cheapest route, where the cost of a route is equal to the sum of the cost of each of its links;
   j) storing, by means of said computational device, the selected non-assigned user with the definitive route in the definitive route users database and removing said user from the non-assigned users database;
   k) repeating, by means of said computational device, the steps g), h), i) and j) until no users remain in said non-assigned users database; and
   l) storing, by means of said computational device, the definitive routes of each user in a definitive route database.

2. The computer-implemented routing method according to claim 1, wherein the plurality of non-assigned users stored on the non-assigned users database are sorted according to the number of links used by the preliminary route of each non-assigned user, from the non-assigned user having the preliminary route that uses less links to the non-assigned user having the preliminary route that uses more links, and wherein the non-assigned users having preliminary routes using equal number of links are sorted according to the traffic load, from the lowest to highest traffic load.

3. The computer-implemented routing method according to claim 1, wherein the plurality of non-assigned users stored on the non-assigned users database are sorted according to the number of links used by the preliminary route of each non-assigned user, from the non-assigned user having the preliminary route that uses less links to the non-assigned user having the preliminary route that uses more links, and wherein the non-assigned users having preliminary routes using equal number of links are sorted according to the traffic load, from the highest to lowest traffic load.

4. The computer-implemented routing method according to claim 1, wherein the plurality of non-assigned users stored on the non-assigned users database are sorted according to the number of links used by the preliminary route of each non-assigned user, from the non-assigned user having the preliminary route that uses more links to the non-assigned user having the preliminary route that uses less links, and wherein the non-assigned users having preliminary routes using equal number of links are sorted according to the traffic load, from the highest to lowest traffic load.

5. The computer-implemented routing method according to claim 1, wherein the plurality of non-assigned users stored on the non-assigned users database are sorted according to the number of links used by the preliminary route of each non-assigned user, from the non-assigned user having the preliminary route that uses more links to the non-assigned user having the preliminary route that uses less links, and wherein the non-assigned users having preliminary routes using equal number of links are sorted according to the traffic load, from the lowest to highest traffic load.

6. The computer-implemented routing method according to claim 1, wherein the traffic load of each link $\ell$, $\rho_\ell$, is calculated by the formula:

$$\rho_\ell = \sum_{u_\ell} \rho_u$$

wherein $u_\ell$ is the plurality of users whose definitive routes uses the link $\ell$ and $\rho_u$ is the traffic load of the selected non-assigned user u, and links that are not used by any definitive route are assigned traffic load equal to 0.

7. The computer-implemented routing method according to claim 1, wherein the average traffic load, $\bar{\rho}$, is obtained by the formula $$\bar{\rho} = \frac{\sum_\ell \rho_\ell}{L}.$$

8. The computer-implemented routing method according to claim 1, wherein non-operational routes are obtained by means of the Dijkstra algorithm.

* * * * *